Nov. 19, 1929.    H. PFERDMENGES    1,736,359
APPARATUS FOR MOISTENING YARNS, THREADS, AND THE LIKE
Filed Jan. 23, 1926
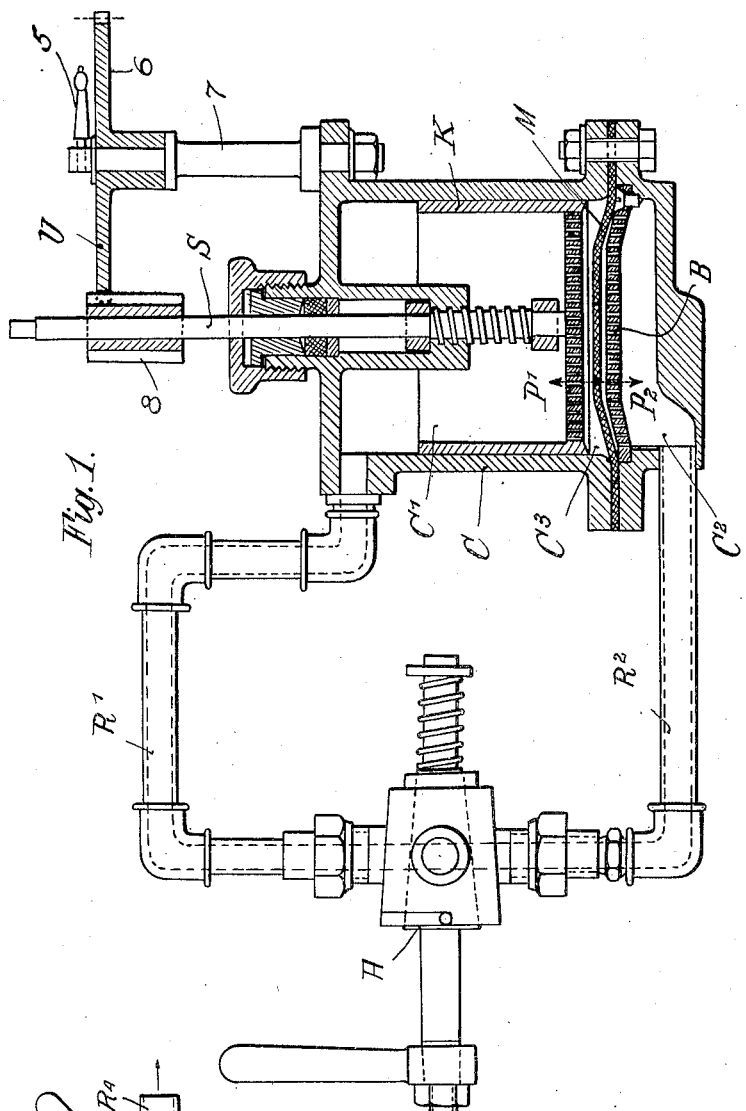
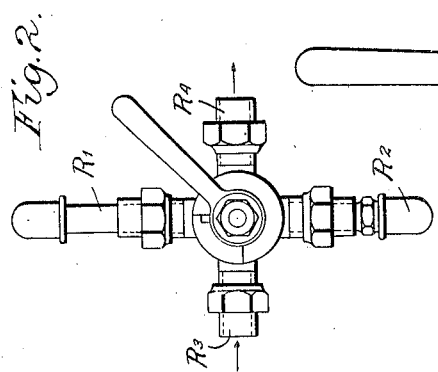
H. Pferdmenges
INVENTOR
By: Marks & Clark
ATTYS Patented Nov. 19, 1929

1,736,359

UNITED STATES PATENT OFFICE

HEINRICH PFERDMENGES, OF GIESENKIRCHEN, GERMANY

APPARATUS FOR MOISTENING YARNS, THREADS, AND THE LIKE

Application filed January 23, 1926, Serial No. 83,323, and in Germany January 26, 1925.

In the manufacture of yarns, threads and the like from fibrous materials by the common spinning process the textile fibres are usually dried out excessively so that they must be subjected to a subsequent moistening operation. To this end it is customary to place the finished yarns or the like in the usual storing or conveying cases in superposed layers and moisten each layer by spraying a certain quantity of water thereupon. The quantity of the water and the proper distribution thereof over the area of the layer mainly depend upon the reliability and skill of the operator. Hence it frequently occurs that some layers are moistened excessively whilst other layers are not moistened sufficiently which is objectionable for several reasons. Especially excessive moisture will damage the yarns and reduce their value.

The object of my invention is to remedy this defect and with this aim in view I provide an apparatus or device including an adjustable container for the reception and the discharge of the moistening liquid and which is equipped with means, such as a precision threaded spindle and an indicating device having a pointer as usually employed, for adjusting the capacity thereof, the said container being further provided with a diaphragm for alternately closing the same, and a four-way cock being provided for allowing single charges of water to flow into the container and to be discharged therefrom. Each operation of filling and emptying the container will require a single manipulation of the four-way cock only.

With the above recited object in view, reference is had to the following specification and drawings in which there is exhibited one example or embodiment of the invention which is in no way intended as a limitation upon the scope of the appended claims as it is to be clearly understood that variations and modifications which properly fall within the scope of said claims may be resorted to when found expedient.

In the accompanying drawing,

Figure 1 is a side elevation, partly in section, of the moistening apparatus.

Figure 2 is a front elevation of the control valve.

Referring to the drawings water under pressure is caused to flow alternately through the pipe $R^1$ and through the pipe $R^2$ to the water spaces $C^1$ and $C^2$, respectively, of the measuring container C. The latter comprises a cylinder and a hollow cover providing the space $C^2$ a diaphragm M being inserted between the meeting annular flanges of the said cylinder and cover, bolts being provided to tightly clamp the peripheral portion or rim of the said diaphragm between the flanges and hold the diaphragm in place, while at the same time the cylinder and the cover are rigidly interconnected thereby.

The water measuring space $C^3$ is controlled, in a known manner, by a sliding cylinder K adapted to be adjusted or set in the position corresponding to the quantity of water required for a single spraying operation, with the aid of a spindle S threaded in the container C and an indicating device having a pointer 5, and a rotatable gear wheel 6 mounted on a spindle 7. The wheel 6 meshes with a pinion 8 on the spindle S whereby the latter is turned upon movement of the wheel 6.

The operation is as follows:

Upon setting the four-way cock A in one direction water under pressure is allowed to flow to the water space $C^2$ in order to pass through the perforated top plate B thereof and to raise the diaphragm M until the latter is in intimate touch with the bottom of the adjusted sliding cylinder K. By thus setting or turning the four-way cock A a predetermined or calculated quantity of water is supplied to the space $C^2$ by way of the piping $R^2$. As the space $C^1$ inclusive of space $C^3$ was full of water resulting from the previous operation, at the time the water is conveyed into the space $C^2$, as above described, the rising diaphragm causes the predetermined or calculated portion or quantity of water to be expelled from the spaces $C^1$ and $C^3$ through the piping $R^1$, the four-way cock and the socket $R^4$ to the spraying nozzle (not shown) for moistening the layer of yarn.

This done the operator now turns the four-way cock for 90° whereby water under pressure is allowed to flow through the pipe $R^1$ into the space $C^1$ and to force the diaphragm down into the top plate B. It will be clearly seen, that a quantity of water exactly like that which had been expelled before through the pipe $R^1$, now will be expelled from the space $C^2$ through the pipe $R^2$, the four-way cock and the socket $R^4$ to the spraying nozzle for moistening the next layer of yarn which, in the meantime, had been placed on top of the previously moistened layer.

The described moistening operations are repeated in a similar manner as long as fresh layers of yarn are placed upon each other to form the required pile.

In accordance with the size of the cases employed for putting up the yarn, the volume of the single skeins or cops and the nature of the fibres, a predetermined quantity of water is required for moistening each layer of the pile and the calculated or predetermined amount of water must be maintained to be exactly the same for each layer; that is to say, the moistening apparatus must not only be adapted to be adjustable within wide limits according to the several varying requirements, but also adapted to supply and eject, when adjusted for a certain quantity of water to be expelled at each stroke, invariably this said quantity of water at each stroke.

In the apparatus shown and described the means provided for adjusting purposes comprise the spindle S having a delicate thread and a precision gear co-operating therewith and with the indicating device U comprising a pointer. By turning the spindle S in the one or the other direction the sliding cylinder K is raised or lowered to occupy the position or level required for causing a predetermined quantity of water to be delivered through the socket $R^4$ at each reversal of the handle of the four-way cock A. The adjusted position or level of the piston valve K ensures a displacement of the diaphragm M exactly corresponding to the particular adjustment of the case so that the quantity of water to be delivered for the spraying purpose will always remain accurately the same as long as the sliding cylinder remains in its adjusted position.

What I claim is:—

1. An apparatus for moistening yarns, threads and the like, comprising a measuring container consisting of two water spaces with an adjusting space intermediate between the said two spaces and in communication with the latter, a yielding diaphragm in the said intermediate space and adapted to be displaced in two directions, and means for variably limiting the displacement of the diaphragm, substantially as and for the purposes set forth.

2. An apparatus for moistening yarns, threads and the like, comprising a container composed of two water chambers and an adjusting chamber therebetween having perforated end walls, a yielding diaphragm in the latter chamber, means for adjusting the one end wall with relation to the other end wall, piping connecting the said two chambers with each other, and a four-way cock in said piping, substantially as and for the purpose set forth.

3. An apparatus for moistening yarns, threads and the like, including a measuring container, a diaphragm formed of flexible fluid tight material located in and having its marginal portions secured to the container, and means for variably limiting the displacement of the diaphragm.

In testimony whereof I affix my signature.

HEINRICH PFERDMENGES.